(12) United States Patent
Kondo et al.

(10) Patent No.: US 10,118,275 B2
(45) Date of Patent: Nov. 6, 2018

(54) BLAST TREATMENT DEVICE AND BLAST TREATMENT METHOD

(71) Applicant: FUJI JUKOGYO KABUSHIKI KAISHA, Tokyo (JP)

(72) Inventors: Yoshihiko Kondo, Tochigi (JP); Hirotsugu Takazawa, Tochigi (JP); Shinya Matsuo, Tokyo (JP); Tatsuo Nakahata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 292 days.

(21) Appl. No.: 14/828,936

(22) Filed: Aug. 18, 2015

(65) Prior Publication Data

US 2016/0059386 A1 Mar. 3, 2016

(30) Foreign Application Priority Data

Aug. 28, 2014 (JP) ................................ 2014-173839

(51) Int. Cl.
*B24C 9/00* (2006.01)
*B24C 1/06* (2006.01)
(Continued)

(52) U.S. Cl.
CPC ............... *B24C 9/006* (2013.01); *B24C 1/06* (2013.01); *B24C 3/065* (2013.01); *B24C 9/003* (2013.01); *B24C 11/00* (2013.01); *Y02P 70/179* (2015.11)

(58) Field of Classification Search
CPC .. B24C 3/04; B24C 3/06; B24C 3/065; B24C 3/067; B24C 9/003; B24C 9/006; B24C 11/00; Y02P 70/179
See application file for complete search history.

(56) References Cited

U.S. PATENT DOCUMENTS 847,270 A * 3/1907 Wise ....................... B24C 3/065
　　　　　　　　　　　　　　　　　　　　　451/87
2,597,434 A * 5/1952 Bishop ................... B24C 3/065
　　　　　　　　　　　　　　　　　　　　　451/101
(Continued)

FOREIGN PATENT DOCUMENTS

JP　　S52-008599　　　3/1977
JP　　S62-028173 A　　2/1987
(Continued)

OTHER PUBLICATIONS

Extended European search report dated Jan. 26, 2016, in Patent Application No. 15 182 441.4 (8 pages).
(Continued)

*Primary Examiner* — Timothy V Eley
(74) *Attorney, Agent, or Firm* — Smith, Gambrell & Russell, LLP (57) ABSTRACT

According to one implementation, a blast treatment device includes an injection part and a circulating system. The injection part injects media toward a workpiece made with a composite material. The media each has a weight difference from a resinic particle dropping from the composite material. The weight difference is not less than a threshold or more than the threshold. The circulating system recovers the injected media and supplies the recovered media to the injection part. The circulating system has an impurity separation part that removes at least one of impurities and media, of which particle sizes have become small, each included in the recovered media.

19 Claims, 4 Drawing Sheets

(51) Int. Cl.
*B24C 3/06* (2006.01)
*B24C 11/00* (2006.01)

(56) References Cited

U.S. PATENT DOCUMENTS

| | | | | |
|---|---|---|---|---|
| 2,770,924 | A * | 11/1956 | Mead | B24C 3/062 |
| | | | | 15/302 |
| 2,810,991 | A * | 10/1957 | Mead | B24C 3/065 |
| | | | | 15/321 |
| 3,447,272 | A * | 6/1969 | Eppler | B24C 3/22 |
| | | | | 451/38 |
| 3,553,895 | A * | 1/1971 | Power | B24C 9/003 |
| | | | | 451/102 |
| 4,044,507 | A * | 8/1977 | Cox | B24C 9/003 |
| | | | | 451/38 |
| 4,984,397 | A * | 1/1991 | Van Leeuwen | B24C 3/065 |
| | | | | 451/100 |
| 4,993,200 | A * | 2/1991 | Morioka | B24C 3/065 |
| | | | | 451/88 |
| 5,181,348 | A | 1/1993 | Roemmele et al. | |
| 5,353,729 | A | 10/1994 | Goldbach et al. | |
| 5,529,530 | A * | 6/1996 | McPhee | B24C 3/06 |
| | | | | 451/38 |
| 5,545,074 | A * | 8/1996 | Jacobs | B24C 3/065 |
| | | | | 451/102 |
| 6,132,296 | A | 10/2000 | Mansfield | |
| 6,390,898 | B1 * | 5/2002 | Pieper | B08B 3/024 |
| | | | | 451/100 |
| 7,182,671 | B1 * | 2/2007 | Shimizu | B24C 3/065 |
| | | | | 451/38 |
| 7,416,471 | B2 * | 8/2008 | Shimizu | B24C 9/003 |
| | | | | 451/2 |
| 2004/0053561 | A1 * | 3/2004 | Pieper | B24C 1/04 |
| | | | | 451/38 |
| 2007/0042676 | A1 | 2/2007 | Shimizu et al. | |
| 2007/0218808 | A1 | 9/2007 | Shimizu et al. | |
| 2009/0107629 | A1 | 4/2009 | Oguri | |
| 2016/0051976 | A1 * | 2/2016 | Yoshikawa | B01J 38/00 |
| | | | | 502/20 |
| 2016/0059385 | A1 | 3/2016 | Kondo et al. | |

FOREIGN PATENT DOCUMENTS

| | | |
|---|---|---|
| JP | H04-74868 A | 3/1992 |
| JP | 3023883 U | 2/1996 |
| JP | 2001-113465 A | 4/2001 |
| JP | 2007-244980 | 9/2007 |
| JP | 2009-298644 | 12/2009 |
| JP | 2013-215826 | 10/2013 |
| WO | 2012/117748 A1 | 9/2012 |

OTHER PUBLICATIONS

U.S. Appl. No. 14/829,002, Kondo, et al., filed Aug. 18, 2015.
First Chinese Office Action dated May 31, 2018 in CN Patent Application No. 201510523215.6 (8 pages in Chinese with English machine translation).
Japanese Office Action dated Jul. 3, 2018 in JP Patent Application No. 2014-173884 (4 pages in Japanese with English machine translation).
Japanese Office Action dated Jul. 3, 2018 in JP Patent Application No. 2014-173839 (3 pages in Japanese with English machine translation).
First Japanese Office Action dated Mar. 27, 2018 in JP Patent Application No. 2014-173839 (4 pages in Japanese with English Translation).
First Japanese Office Action dated Mar. 20, 2018 in JP Patent Application No. 2014-173884 (4 pages in Japanese with English Translation).

* cited by examiner

BLAST TREATMENT DEVICE AND BLAST TREATMENT METHOD

CROSS REFERENCES TO RELATED APPLICATIONS

This application is based upon and claims the benefit of priority from Japanese Patent Application No. 2014-173839, filed on Aug. 28, 2014; the entire contents of which are incorporated herein by reference.

FIELD

Implementations described herein relate generally to a blast treatment device and a blast treatment method.

BACKGROUND

Conventionally, in case of painting or bonding a composite material, such as GFRP (glass fiber reinforced plastics) or CFRP (carbon fiber reinforced plastics), which is used as a material of aircraft parts or the like, blast treatment as pretreatment is performed for the surface of the composite material.

In particular, an aircraft part, such as a panel, has a meter order in size and very large. Therefore, blast treatment by the conventional blast treatment device having multijoint arm requires to prepare a very long and large scale arm.

Thus, a blast treatment device which can move a position of a nozzle, for injecting media of blast treatment, relative to a workpiece by a slide mechanism has been devised so that the blast treatment of a workpiece having a large size or a complicated form can be performed flexibly (for example, refer to Japanese Patent Application Publication No. 2013-215826).

Furthermore, in case of blast treatment of a composite material, it has also been reported that to use particulates, whose average particle size is not less than 10 µm and not more than 100 µm, as media is especially preferable (for example, refer to Japanese Patent Application Publication No. 2007-244980).

An object of the present invention is to provide a blast treatment device and a blast treatment method which can perform blast treatment more efficiently.

SUMMARY OF THE INVENTION

In general, according to one implementation, a blast treatment device includes an injection part and a circulating system. The injection part injects media toward a workpiece made with a composite material. The media each has a weight difference from a resinic particle dropping from the composite material. The weight difference is not less than a threshold or more than the threshold. The circulating system recovers the injected media and supplies the recovered media to the injection part. The circulating system has an impurity separation part that removes at least one of impurities and media, whose particle sizes have become small, each included in the recovered media.

Further, according to one implementation, a blast treatment method includes manufacturing a blast treated product by injecting the media toward the workpiece, made with the composite material, using the above-mentioned blast treatment device.

Further, according to one implementation, a blast treatment method includes: manufacturing a blast treated product by injecting media toward a workpiece made with a composite material; recovering the injected media; removing at least one of impurities and media, whose particle sizes have become small, each included in the recovered media; and storing media, from which the at least one of the impurities and the media whose the particle sizes have become small have been removed, for a next blast treatment. The media each has a weight difference from a resinic particle dropping from the composite material. The weight difference is not less than a threshold or inure than the threshold.

DETAILED DESCRIPTION

A blast treatment device and a blast treatment method according to implementations of the present invention will be described with reference to the accompanying drawings.
(Structure and Function)

Figure 1:
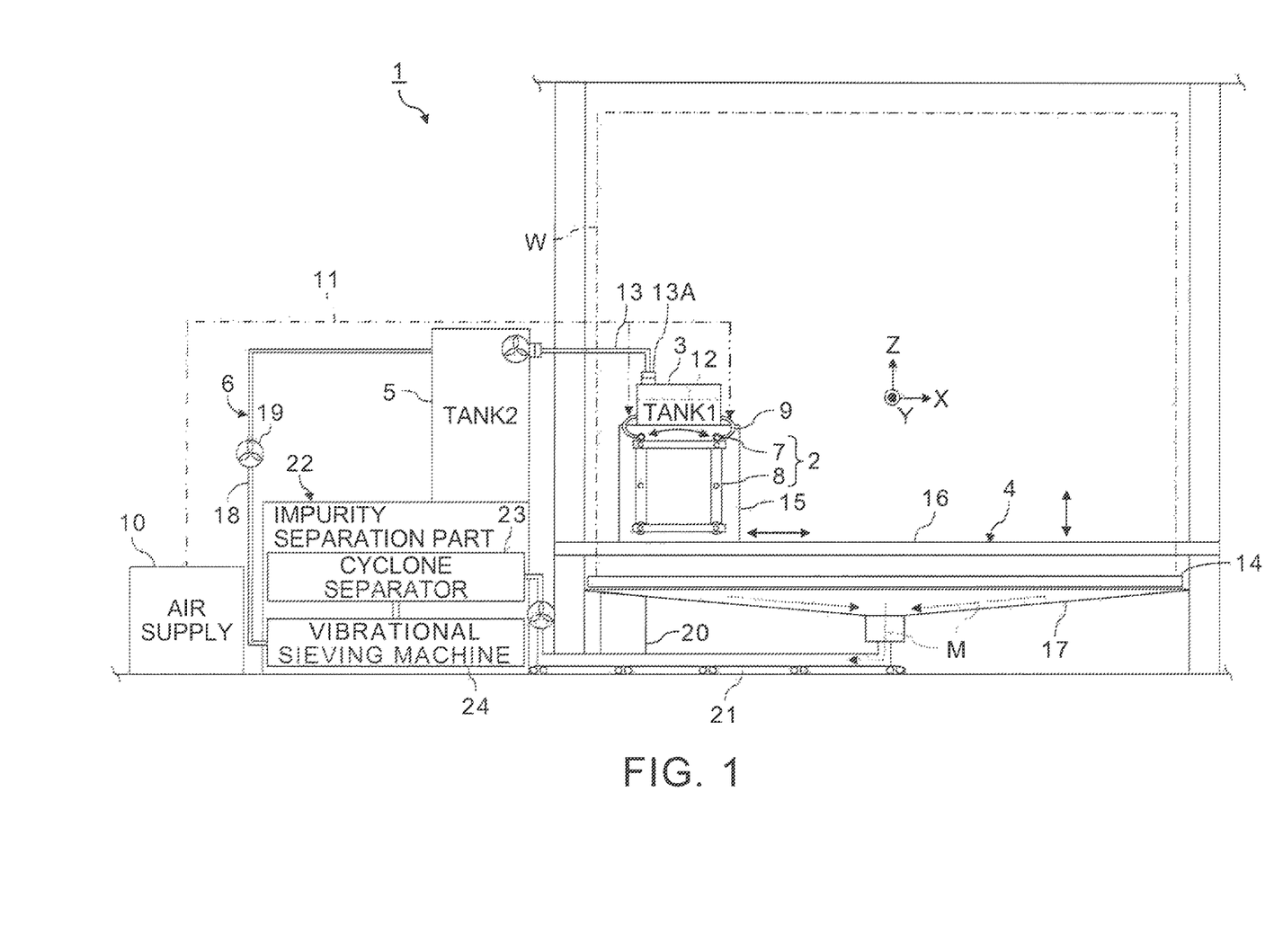
FIG. 1 is a front view of a blast treatment device according to an implementation of the present invention.
Figure 2:
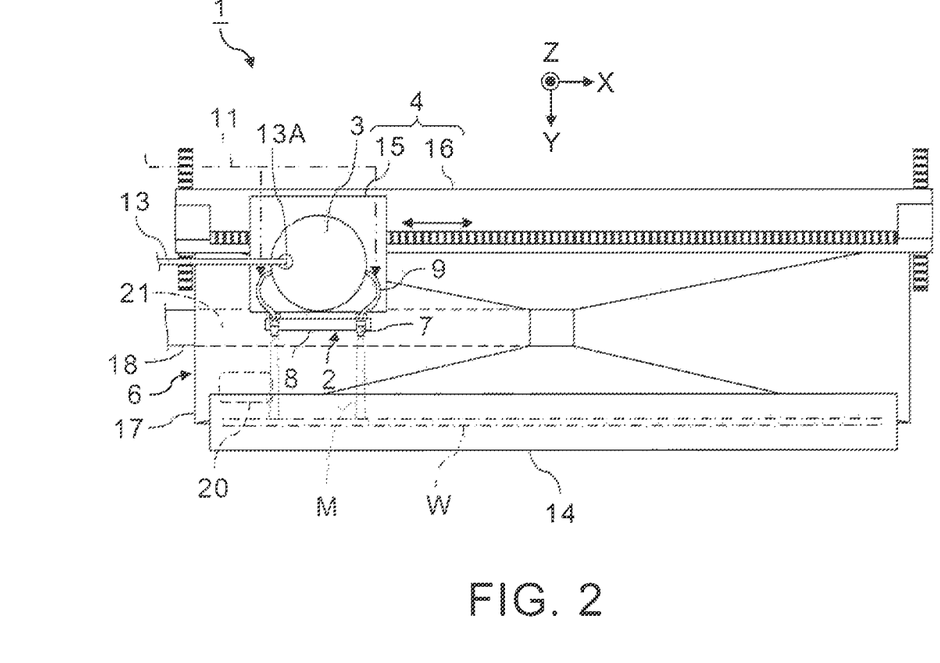
FIG. 2 is a top view of a processing area of the blast treatment device shown in FIG. 1.

FIG. 1 is a front view of a blast treatment device according to an implementation of the present invention, and FIG. 2 is a top view of a processing area of the blast treatment device shown in FIG. 1.

The blast treatment device 1 is a device which performs shot blasting in order to activate a surface of a workpiece W made with a composite material, such as CFRP or GFRP, before a paint or a bond. In shot blasting of a composite material, granular media (projection material) M are made to collide on the workpiece W to roughen the surface so that the wettability of a paint or an adhesive can be improved. Hard particles, such as ceramic, are a typical example of the media M for blast treatment. More specifically, ceramic particles, such as alumina, silica, silicon carbide or zirconia particles, can be used as the media M for blast treatment.

The blast treatment device 1 has a blast injection part 2, the first tank 3, a moving mechanism 4, the second tank 5 and a circulating system 6.

The blast injection part 2 has at least one nozzle 7, which injects the media M toward the workpiece W, and a nozzle swing part 8 which swings the nozzle 7 or the nozzles 7 along an arc-like locus like a wiper. In the illustrated example, the blast injection part 2 has the two nozzles 7. Furthermore, a linkage mechanism for swinging the two nozzles 7 is installed as the nozzle swing part 8. Note that, the nozzle swing part 8 may be omitted.

The first tank 3 is a reservoir tank for supplying the media M to each nozzle 7. It is appropriate to couple the first tank 3 and the nozzles 7 by the first hoses 9, whose lengths are constant, respectively. The nozzles 7 are coupled to an air supply system 10, which generates and supplies compressed air, by air supply hoses 11, besides the first tank 3. Typically, the air supply hoses 11 are coupled to the first hoses 9. Therefore, the media M can be injected from the respective nozzles 7 by the compressed air supplied from the air supply system 10 through the air supply hoses 11. Note that, it is desirable to install a filter 12 in the first tank 3 so that the media M are not discharged out of the first tank 3.

Meanwhile, the second tank 5 is a reservoir tank for supplying the media M to the first tank 3. Preferably, the second tank 5 is coupled to the first tank 3 by the second hose 13 having a detachable mechanism 13A, such as a coupler. This is because the second hose 13 can be detached for preventing an interference, except for the time of supplying the media M from the second tank 5 to the first tank 3, when the second hose 13 having the detachable mechanism 13A connects between the first tank 3 and the second tank 5.

The moving mechanism 4 has a function to move the nozzles 7 and the first tank 3. Furthermore, the moving mechanism 4 may be configured to move a table 14 for placing the workpiece W. Meanwhile, the second tank 5 does not move by the moving mechanism 4. In the illustrated example, the moving mechanism 4 has a holding part 15, which fixes the blast injection part 2 and the first tank 3, and a driving mechanism 16, which moves the holding part 15 in three axis directions of the X-axis, the Y-axis and the Z-axis directions. That is, the moving mechanism 4 is a gondola type of one which fixes the blast injection part 2 and the first tank 3 to the holding part 15 and moves the holding part 15 in the horizontal direction and the vertical direction by the driving mechanism 16.

A structure of the moving mechanism 4 is arbitrary as long as the structure can move the blast injection part 2 and the first tank 3 in one desirable axis direction or a plurality of desirable axis directions. Therefore, the moving mechanism 4 can be configured using a variety of elements, such as a linkage mechanism, a slide mechanism and/or a multijoint arm. As a practical example, the nozzles 7 may be configured to be able to be tilted in a desired direction from the workpiece W.

Furthermore, it is desirable to make a capacity of the first tank 3 smaller than a capacity of the second tank 5 from a viewpoint of simplifying a scale of the moving mechanism 4. Specifically, when a sufficient amount of the media M are reserved in the second tank 5 while a necessary amount of the media M for blast treatment are supplied to the first tank 3 as needed, the first tank 3 can be miniaturized in size. As a result, rigidities required for the holding part 15 and the moving mechanism 4 can be reduced.

The circulating system 6 recovers the media M after the injection and supplies the recovered media M to the second tank 5 and the blast injection part 2. For example, the circulating system 6 can be composed of a duct 17, which recovers the fallen media M, a recovery hose 18, which moves the media M discharged from the outlet of the duct 17 to the second tank 5, and at least one fan 19, which forms an air flow for moving the media M in the recovery hose 18. The duct 17 may have a vibration device 20 for shaking off the media M. Furthermore, the circulating system 6 can also use a desirable device, such as a belt conveyor 21, which conveys the media M as illustrated. Note that, the fan 19 can be placed not only in the circulating system 6 but also in an arbitrary position on a pathway of the media M, as necessary.

In particular, in case of reusing the media M after the injection, using alumina whose nominal designation number is No. 100 (#100) contributes to improve a recovery rate of the media M. The nominal designation number shows a particle size range (a range of average particle size). Alumina #100 are particles whose granularity range is from 106 µm to 150 µm.

Conventionally, alumina #180 whose particle size range is from 53 µm to 90 µm has been considered to be preferable as media for blast treatment of a composite material. Alumina #100 has a larger average particle size compared to alumina #180. Therefore, when alumina #100 is used, clogging by ceramic particles solidified due to moisture, in the pathway of the media, can be prevented satisfactorily, compared to a case where alumina #180 is used.

For example, clogging of the media M in the filter 12 installed in the first tank 3 can be prevented. Furthermore, clogging of the media M in filters installed in a variety of parts can also be prevented. As a result, structures of elements, including the first tank 3, the first hoses 9, the second tank 5 and the second hose 13, on the pathway of the media M can be simplified. Furthermore, the frequency of exchanging the filters and the frequency of cleaning elements, which are on the pathway of the media M, can also be reduced. Thereby, maintaining elements on the pathway of the media M becomes easier.

In addition, the weight of alumina #100 is larger than that of alumina #180. Therefore, an amount of scattering of alumina #100 to the outside of the duct 17 is less than that of alumina #180. That is, when alumina #100 is used as the media M, an amount of the media M falling toward the duct 17 after the injection can be increased, compared to a case where alumina #180 is used. As a result, a recovery rate of the media M can be improved.

It can be considered that using not only alumina but ceramic particles whose particle size range is from 106 µm to 150 µm can prevent clogging in the pathway of the media M. In addition, it can be considered that ceramic particles whose particle size range is from 106 µm to 150 µm have enough weight to fall toward the duct 17. Therefore, it is preferable to use alumina or ceramic particles other than alumina, whose particle size range is from 106 µm to 30 µm, as the media M.

Furthermore, the circulating system 6 can have an impurity separation part 22 which removes at least one of impurities and the media M, whose particle sizes have become small included in the recovered media M. The impurity separation part 22 can be composed of at least one of a cyclone separator (powder separator) 23 and a vibrational sieving machine 24. Note that, it is preferable to configure the impurity separation part 22 by both the cyclone separator 23 and the vibrational sieving machine 24 from a viewpoint of securing a satisfactory separation capacity of impurities from the media M.

Figure 3:
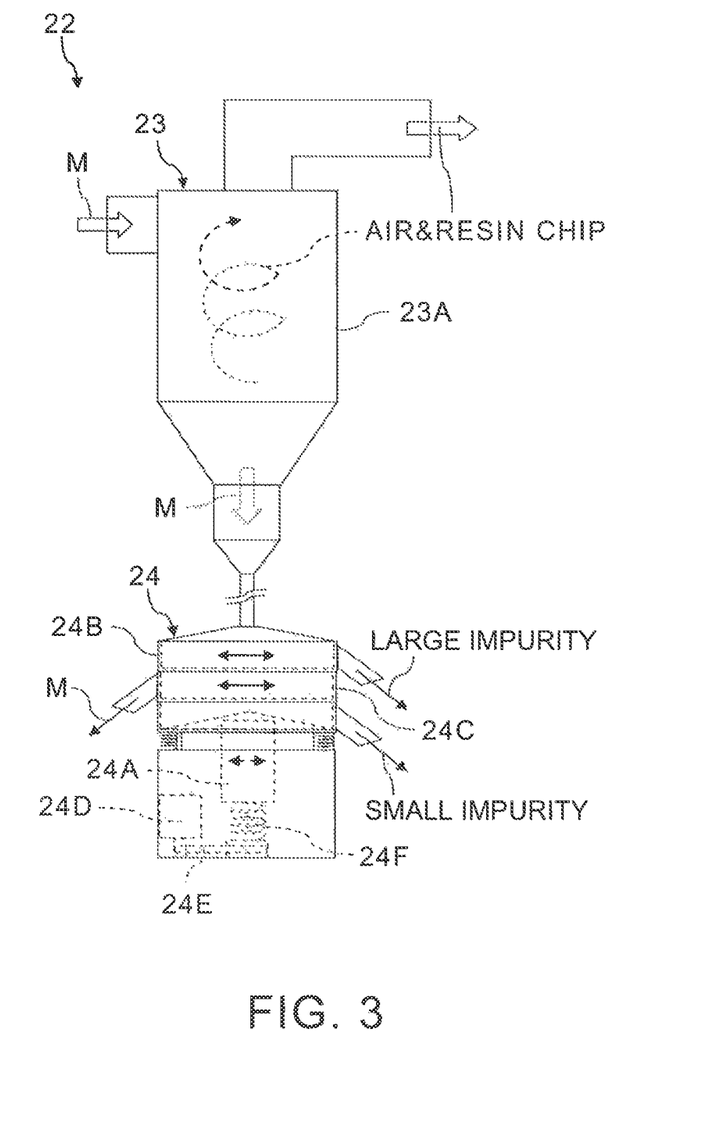
FIG. 3 shows an example of detailed structure of the impurity separation part shown in FIG. 1.

FIG. 3 shows an example of detailed structure of the impurity separation part 22 shown in FIG. 1.

As shown in FIG. 3, the impurity separation part 22 can be configured by connecting the vibrational sieving machine 24 to the subsequent part of the cyclone separator 23.

The cyclone separator 23 is a centrifuge which forms a swirl of air by flowing air including powders, such as the media M and impurities, into the inside of a cylinder 23A so that the powders in the air are separated by the centrifugal force. When the air including the powders, such as the media M and the impurities, is introduced into the cyclone separator 23, powders each having a light weight, such as resin particles scraped away from a composite material by the blast treatment and the media M which have become fine, are discharged upward with the air. Meanwhile, powders each having a heavy weight, such as the media M which hit on a wall surface inside the cyclone separator 23 by the centrifugal force, fall by the action of the gravity. As a result, the powders each having the heavy weight, such as the media M, in the air can be selectively recovered.

In order to satisfactorily separate the media M from resin particles in the cyclone separator 23, it is important to raise a difference between a weight of the medium M and a weight of each resin particle. Therefore, it is appropriate to inject the media M, each having a weight difference not less than a threshold or more than the threshold from each resin particle dropped from a composite material, toward the workpiece W. The threshold for determining the weight difference between the media M and the resin can be empirically determined by blast treatment tests.

According to blast treatment tests which have been actually performed, it has been confirmed that using alumina #100 as the media M is preferable in case of performing blast treatment of a composite material, such as CFRP, from a viewpoint of preventing clogging due to humidity, improving a recovery rate of the media M by reducing the amount of scattering of the media M to the outside of the duct 17, and satisfactorily separating the media M from resin chips. This can be considered to be similar also in case of using ceramic particles other than alumina, as long as their particle size range is from 106 μm to 150 μm, since those ceramic particles have enough weight differences from resin chips.

When a certain amount of the media M from which lightweight impurities, such as resin chips, have been removed are recovered by the cyclone separator 23, the recovered media M are put into the vibrational sieving machine 24.

The vibrational sieving machine 24 separates powders having different particle sizes by vibrating sieves 24B and 24C with a vibrating body 24A. The typical vibrational sieving machine 24 is configured to vibrate the sieves 24B and 24C together with the vibrating body 24A by spring rotation of a motor 24D to a driving spring 24F through a belt 24E.

In particular, using the two stage vibrational sieving machine 24 which includes two sieving nets having different opening sizes allows screening the media M in a specific particle size range.

As a specific example, when ceramic particles, such as alumina #100, whose particle size range is from 106 μm to 150 μm are used as the media M, what is necessary is to install the vibrational sieving machine 24, for selectively extracting the ceramic particles whose particle size range is from 106 μm to 150 μm, in the impurity separation part 22. Specifically, the two stage vibrational sieving machine 24 composed of the first sieve 24B, having larger openings than 150 μm, and the second sieve 24C, having smaller openings than 106 μm, disposed below the first sieve 24B can be used so that particles whose particle size range is from 106 μm to 150 μm can be sorted out.

When the above-mentioned vibrational sieving machine 24 is used, impurities whose particle sizes are larger than the particle size range of the media M can be separated by the first sieve 24B while impurities whose particle sizes are smaller than the particle size range of the media M, such as the media M whose particle sizes have become small, can be separated by the second sieve 24C. Thereby, the high purity media M having an appropriate particle size range can be obtained and reused for blast treatment.

(Operation and Action)

Next, a blast treatment method using the blast treatment device 1 will be described.

Figure 4:
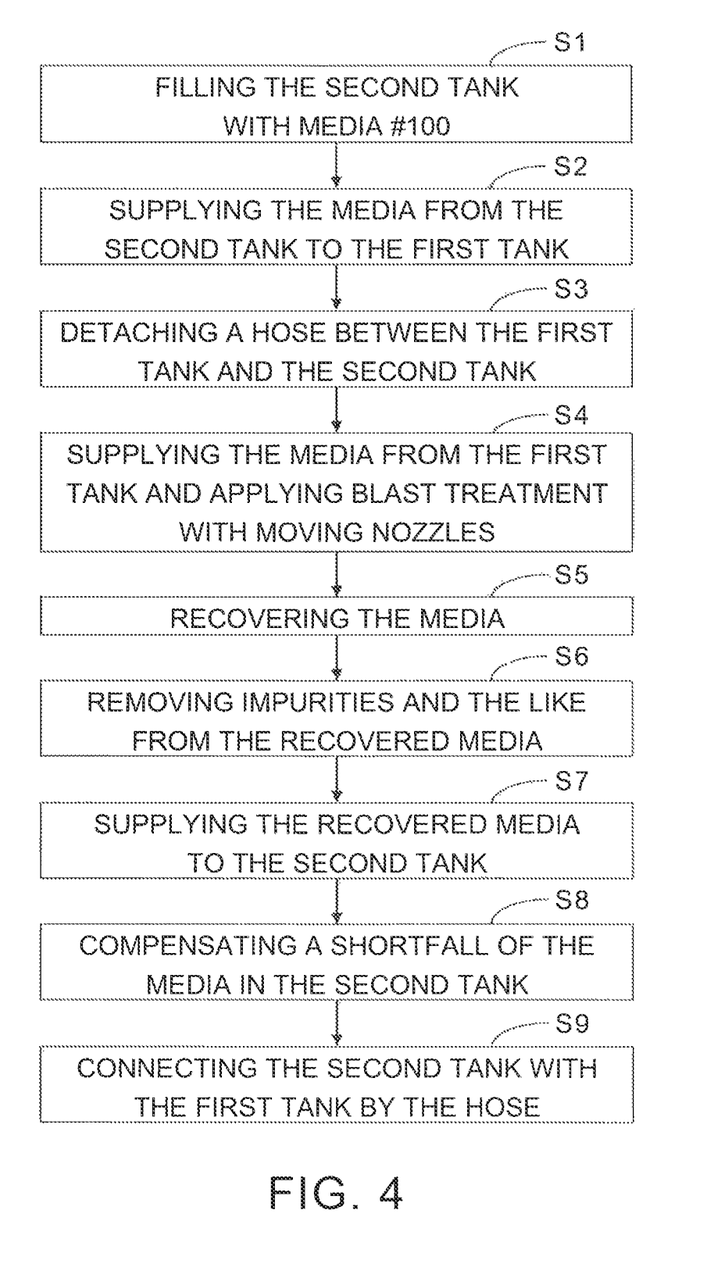
FIG. 4 is a flow chart showing an example of flow of blast treatment by the blast treatment device shown in FIG. 1.

FIG. 4 is a flow chart showing an example of flow of blast treatment by the blast treatment device 1 shown in FIG. 1.

Firstly, in step S1, the second tank 5 is filled up with the media M, such as alumina #100. Next, in step S2, the media M are supplied from the second tank 5 to the first tank 3 through the second hose 13. Next, in step S3, the second hose 13 between the first tank 3 and the second tank 5 is detached. Thereby, preparation for blast treatment is completed. Therefore, a workpiece W which is a target of blast treatment can be placed.

Next, in step S4, the driving mechanism 16 of the moving mechanism 4 moves the holding part 15, with which the blast injection part 2 and the first tank 3 have been fixed, according to a blast treatment position of the workpiece W. Furthermore, the nozzle swing part 8 is driven to swing the two nozzles 7 from side to side. Meanwhile, compressed air is supplied from the air supply system 10 to the first hoses 9 through the air supply hoses 11. Thereby, the media NI are supplied from the first tank 3 to the two swinging nozzles 7 through the first hoses 9. Then, the media M are injected toward the workpiece W from each of the two swinging nozzles 7. As a result, blast treatment is applied on a surface of the workpiece W.

The blast treatment of the workpiece W can be performed not only during swinging the nozzles 7 by the nozzle swing part 8 but also daring moving the blast injection part by the driving mechanism 16. Specifically, the media M, supplied from the first tank 3 to the nozzles 7 with moving the first tank 3 and the nozzles 7 by the driving, mechanism 16, can be injected toward the workpiece W. Therefore, blast treatment of the workpiece W, having a large size, like an aircraft part can be performed continuously with changing injected positions of the media M.

Furthermore, the first tank 3 has been coupled to the respective nozzles 7 by the first hoses 9 whose lengths are constant. Therefore, the length of a pathway of the media M between the first tank 3 and each nozzle 7 is constant. Hence, the media M can be injected with an equivalent pressure constantly during movement of the blast injection part 2.

Meanwhile, the second hose 13 between the first tank 3 and the second tank 5 has been detached before the blast treatment. Specifically, the pathway of the media M between the first lank 3 and the second tank 5 is changed into the disconnected state in the interval after supplying the media M from the second tank 5 to the first tank 3 and before moving the first tank 3 and the nozzle 7. Therefore, interference by the second hose 13 can be avoided even when the first tank 3 has moved.

When the media M are injected to all injection positions of the workpiece W the required number of times by swinging the nozzles 7 and moving the blast injection part 2, a blast treated product can be manufactured as the composite material after the blast treatment. Then, the blast treated product after the blast treatment is taken out from the blast treatment device 1.

Next, in step S5, the media M after the injection are recovered by the circulating system 6. In case of the blast treatment device 1 having the structure shown in FIG. 1, the vibration device 20 vibrates the duct 17. Thereby, the media M fallen into the duct 17 are discharged from the outlet of the duct 17 to the recovery hose 18. On the other hand, the fan 19 rotates so that the media M in the recovery hose 18 move.

Next, in step S6, impurities included in the recovered media M and the media M whose particle sizes have become small are removed by the impurity separation part 22. The cyclone separator 23 and the vibrational sieving machine 24 can be used for removing the impurities or the like.

The cyclone separator 23 can separate impurities, such as resin chips having light weights and the media M which have become fine, from the media M. Meanwhile, the vibrational sieving machine 24 can sort out the media M in an appropriate particle size range. In particular, in case of using alumina #100 or ceramic particles whose particle size range is similar to that of alumina #100, as the media M, the impurities, such as resin chips, can be easily separated from the media M because of an enough weight difference and volume difference between the media M and the impurities.

Next, in step S7, the media M after the removal of the impurities and the media M whose particle sizes have become small are supplied to the second tank 5. Thereby, the recovered media M are preserved for the next blast treatment.

Note that, an amount of the media M filled in the second tank 5 may be insufficient depending on a recovery rate of the media M. In that case, a shortfall of the media M is compensated in the second tank 5 in step S8. When the second tank 5 is filled up with a sufficient amount of the media M, the second tank 5 is coupled to the first tank 3 by the second hose 13 in step S. Thereby, the blast treatment can restart by reusing the media M.

That is, the blast treatment device 1 and the blast treatment method as described above are to use the media M, such as alumina #100, which have enough weight differences from resin particles, for blast treatment of a composite material, such as CFRP, and remove impurities or the like from the media M after the injection so as to allow reusing the media M.

(Effects)

Therefore, according to the blast treatment device 1 and the blast treatment method as described above, a recovery rate of the media M after the injection in the blast treatment can be improved. As a result, the recovered media M can be reused. Therefore, it is possible to reduce consumption of the media M and the manufacturing costs in blast treated products.

Furthermore, since the used media M have enough weight differences from resin particles, the resin particles mixing in the media M can be easily separated by the cyclone separator 23 or the like. In addition, the media M having an appropriate particle size range can be sorted out by using the vibrational sieving machine 24 or the like together. Therefore, the blast treatment can be performed by reusing the media M involving a few impurities. As a result, performance of the blast processing can be kept with reusing the media M. In particular, deterioration in the performance of the blast treatment can be prevented by avoiding use of fine broken media M. In other words, it becomes possible to reuse the media M after the injection by effectively removing impurities, such as the media M whose sizes are not appropriate and resin chips.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying, claims and their equivalents are intended to cover such forms or modifications as would fall within the scope and spirit of the invention.

What is claimed is:

1. A blast treatment device comprising:
   an injection part that injects media toward a workpiece made with a composite material comprising a resin, the media each having a weight difference from resinic particles departing from the composite material due to contact of injected media with the composite material; and
   a circulating system that recovers the injected media and supplies recovered media to the injection part,
   wherein the circulating system has an impurity separation part that removes, from the recovered media, media that is reduced in size following contact with the composite material and that has a particle size falling below a first threshold value, as well as impurities that have a particle size falling above a second threshold value higher than the first threshold value, wherein reduced in size media and impurities removed by the impurity separation part are precluded from being injected by the injection part;
   wherein the injection part has:
      at least one nozzle that injects the media toward the workpiece;
      a first tank that supplies the media to the at least one nozzle;
      a movement structure that moves the at least one nozzle and the first tank; and
      a second tank that supplies the media to the first tank, the second tank being configured not to be moved by the movement structure, and
   wherein the circulating system is configured to supply recovered media, from which the reduced in size media and impurities have been removed by the impurity separation part, to the second tank.

2. The blast treatment device according to claim 1,
   wherein the impurity separation part has at least one of a cyclone separator and a vibrational sieving machine.

3. The blast treatment device according to claim 2
   wherein the injection part injects ceramic particles as the injected media, and the impurity separation part has a vibrational sieving machine that selectively extracts ceramic particles from the recovered media of which average particle size is from 106 µm to 150 µm.

4. A blast treatment method for manufacturing a blast treated product by injecting the media toward the workpiece, made with the composite material, using the blast treatment device according to claim 3.

5. A blast treatment method for manufacturing a blast treated product by injecting the media toward the workpiece, made with the composite material, using the blast treatment device according to claim 2.

6. The blast treatment device according to claim 1,
   wherein the injection part injects ceramic particles as the injected media, and the impurity separation part has a vibrational sieving machine that selectively extracts ceramic particles from the recovered media of which average particle size is from 106 µm to 150 µm.

7. A blast treatment method for manufacturing a blast treated product by injecting the media toward the workpiece, made with the composite material, using the blast treatment device according to claim 6.

8. The blast treatment device according to claim 1,
   wherein the first tank is coupled to the second tank by a hose having a detachable mechanism.

9. A blast treatment method for manufacturing a blast treated product by injecting the media toward the workpiece, made with the composite material, using the blast treatment device according to claim 1.

10. A blast treatment method that utilizes the blast treatment device of claim 1 and comprises steps of:
    manufacturing a blast treated product by injecting media toward the workpiece made with composite material, the injected media each having a weight difference from resinic particles dropping from the composite material;

recovering the injected media;

removing from the recovered media, the reduced in size media whose particle sizes fall below the first threshold; and storing media, from which the reduced in size media has been removed, for a next blast treatment.

11. The blast treatment method according to claim 10, wherein ceramic particles of which average particle size is from 106 μm to 150 μm are used as the media.

12. The blast treatment method according to claim 11, wherein the media and impurities, whose particle sizes fall below the first threshold are removed by both a cyclone separator and a vibrational sieving machine.

13. The blast treatment method according to claim 10, wherein the media and impurities, whose particle sizes fall below the first threshold are removed by both a cyclone separator and a vibrational sieving machine.

14. The blast treatment device according to claim 1 wherein the first threshold value is a particle size value of 106 μm and the second threshold value is a particle size threshold value of 150 μm.

15. A blast treatment device comprising:

an injection part that injects media toward a workpiece made with a composite material comprising a resin, the media each having a weight difference from resinic particles departing from the composite material due to contact of injected media with the composite material; and a circulating system that recovers the injected media and supplies recovered media to the injection part, wherein the circulating system has an impurity separation part that removes, from the recovered media, media that is reduced in size following contact with the composite material and that has a particle size falling below a first threshold value, as well as impurities that have a particle size falling above a second threshold value higher than the first threshold value, wherein reduced in size media and impurities removed by the impurity separation part are precluded from being injected by the injection part, wherein the impurity separation part has a first stage removal section based on the weight difference between injected media and resinic particles, and a second stage removal section that is downstream from the first stage and separates, from the recovered media, selected media designed for return to the injection part, with the selected media having a predetermined size range that does not fall below or exceed, respectively, the first and second threshold values, wherein the first stage removal section includes a cyclone separator for separation of resinic particles from injected media based on weight differential, and wherein the second stage removal section includes a plurality of sieve trays supported on a vibrating body.

16. The blast treatment device according to claim 15 wherein the cyclone separator is configured relative to the weight difference between the injected media and the resinic particles as to preclude resinic particle recirculation to the injection part.

17. A blast treatment device comprising:

an injection part that injects media toward a workpiece made with a composite material comprising a resin, the media each having a weight difference from resinic particles departing from the composite material due to contact of injected media with the composite material; and a circulating system that recovers the injected media and supplies recovered media to the injection part, wherein the circulating system has an impurity separation part that removes from the recovered media, media that is reduced in size following contact with the composite material and that has a particle size falling below a first threshold value, wherein the injection part has:

at least one nozzle that injects the media toward the workpiece;

a first tank that supplies the media to the at least one nozzle;

a movement structure that moves the at least one nozzle and the first tank; and a second tank that supplies the media to the first tank, the second tank being configured not to be moved by the movement structure, and wherein the circulating system is configured such that the movement structure moves the first tank and the at least one nozzle while a supply line from the second tank to the first tank is disconnected.

18. The blast treatment device according to claim 17, wherein the first tank is coupled to the second tank by a hose having a detachable mechanism.

19. The blast treatment device according to claim 17, wherein the impurity separation part has a first stage removal section based on the weight difference between injected media and resinic particles, and a second stage removal section that is downstream from the first stage and separates, from the recovered media, selected media designed for return to the injection part, with the selected media having a predetermined size range that does not fall below the first threshold value, wherein the first stage removal section includes a cyclone separator for separation of resinic particles from injected media based on weight differential, and wherein the second stage removal section includes a plurality of sieve trays supported on a vibrating body.

* * * * *